United States Patent
Ali et al.

[11] Patent Number: 5,853,507
[45] Date of Patent: Dec. 29, 1998

[54] METHOD FOR MANUFACTURING HEAT EXCHANGERS TO ALLOW UNIFORM EXPANSION OF TUBING

[75] Inventors: Amer F. Ali; Kenneth P. Gray, both of East Syracuse; Daniel P. Gaffaney, Chittenango, all of N.Y.

[73] Assignee: Carrier Corporation, Syracuse, N.Y.

[21] Appl. No.: 763,864

[22] Filed: Dec. 11, 1996

[51] Int. Cl.⁶ .................................................. C21D 8/10
[52] U.S. Cl. ........................ 148/519; 148/520; 148/593; 72/369; 72/128
[58] Field of Search .................................. 148/519, 520, 148/590, 593, 909; 72/369, 128

[56] References Cited

U.S. PATENT DOCUMENTS 3,973,999  8/1976  Nakayama et al. .................... 148/593

FOREIGN PATENT DOCUMENTS 63-256225  10/1988  Japan ...................................... 72/369

Primary Examiner—Deborah Yee

[57] ABSTRACT

A method for treating heat exchanger tubing to be expanded by fluidic or electromagnetic expansion. The tubing treatment reduces the increased material hardness of the tubing in areas where cold work has been imparted thereon. By reducing these areas which have increased material hardness, the tubing will have a substantially similar tube yield along its entire length and can therefore be expanded to substantially the same cross-sectional area throughout by either fluidic or electromagnetic expansion. After forming the cold work regions, the regions are annealed with a heat source, such as through flame or induction heating, and are gradually cooled to avoid the effects of quenching.

6 Claims, 4 Drawing Sheets

METHOD FOR MANUFACTURING HEAT EXCHANGERS TO ALLOW UNIFORM EXPANSION OF TUBING

BACKGROUND OF THE INVENTION

1. Field of the Invention

The present invention relates to the expansion of heat exchanger tubing through the use of either the fluidic or electromagnetic expansion process, and more specifically to a method for treating cold work regions on such tubing so that the tubing can expand uniformly along its entirety during these processes.

2. Description of Related Art

Certain applications exist where it is necessary to increase the cross-sectional area of tubing after the tubing has been manufactured. One such application is in the construction of heat exchangers. A heat exchanger is a device for transferring heat between one fluid (usually air) and a second heat transfer fluid. Heat exchangers are constructed by forming a circuit out of conductive tubing through which the heat transfer fluid circulates. Conductive fins are then attached to the circuit to increase its surface area, which facilitates greater contact with the external fluid (i.e., air) and correspondingly facilitates additional heat transfer between the two fluids. However, in order to take advantage of this increased heat transfer there must be a secure and conductive attachment between the tubing and the fins.

Welding cannot be used to form such an attachment in some heat exchangers because it requires the use of very high temperatures, which would damage both the tubing and the fins. Other forms of bonding, such as adhesives, would act as insulators and work against the conductive process. Accordingly, for some heat exchangers the best option for securing the fins to the tubing is to expand the tubing so that it securely engages the fins and forms a conductive connection therewith.

There are basically two styles of heat exchangers currently in use. The first is the type generally found in the heating, ventilating, and air conditioning (HVAC) industry, which is constructed with round tubing and plate fins. Plate fins are typically thin, flat, and rectangular pieces of a light metal, such as aluminum, with pre-formed holes along their surfaces. The tubing sections are typically constructed of copper and formed into "U" shaped bends which resemble hairpins. The ends of these "hairpins" are threaded through the holes in the plate fins. Contact between these tubes and fins is formed by expanding the round tubing such that its circumference is in mesh with the edge of the holes it traverses The second type of heat exchanger is the type generally used in the automotive industry, which is constructed of rectangular tubes and serpentine fins. Serpentine fins are made by bending a thin piece of metal back and forth upon itself into multiple "S" shapes. Those places where the bend forms a point are abutted against the surface of a flat tube. These fins are usually secured to the tubes by brazing.

Two desirable methods for expanding heat exchanger tubing are fluidic expansion and electromagnetic expansion. Fluidic expansion is performed by sealing a length of tubing and injecting a high pressure fluid therein to radially expand the tubing outward. Electromagnetic expansion utilizes magnetic fields to expand the tube walls.

A drawback to both the fluidic and electromagnetic methods is that they expand tubing according to its material hardness. Increased hardness corresponds to an increased tube yield, which means that a higher force is required to impart a permanent deformation to the material. Thus, areas of a tube that have a higher degree of material hardness will not expand as much as other areas of the tube which have a lesser degree of hardness.

Variations in material hardness, which result in non-uniform expansion, are caused by initial strains induced by cold working a metal. A given length of tubing will have increased areas of material hardness where cold work has been performed thereon. Such cold work is necessary for bending or otherwise re-shaping a tube after the tube's initial construction.

One result of a non-uniform expansion is that the cold work areas will not form a sufficient contact with the fins. By way of example, in a HVAC style heat exchanger that utilizes ⅜ inch round tube, typically 0.002–0.004 inches of contact is desired between a tube and fin after expansion to obtain maximum conduction. However, in a cold work area such contact may only reach approximately 0.001 inches or less following fluidic expansion. Moreover, the decreased expansion in cold work areas causes an insecure fit, which can lead to rattling and misalignment of parts after assembly.

Although areas of increased material hardness will eventually expand if a high enough pressure is applied, such a solution is typically not feasible. This is because the extent of the hardness in such an area may be so great as to cause the tube yield to approach or surpass the burst point of the tube. That is, the tube becomes so hard that it cannot be expanded past a certain point without rupturing. This result is especially likely of the thin copper tubes currently used in the heating, ventilation, and air conditioning (HVAC) industry.

There are various methods in the prior art for expanding tubing with hydraulic expansion. There are also examples in the prior art that utilize hydraulic expansion for manufacturing heat exchangers, such as Huggins (U.S. Pat. No. 2,838,830) and Jansson et al. (U.S. Pat. No. 4,970,770). However, none of this art teaches a method for overcoming the affects of cold work to provide a substantially uniform tube yield along the entirety of a given tube.

SUMMARY OF THE INVENTION

It is therefore the primary object of the present invention to provide a method for treating tubing so that it will expand uniformly when a high pressure fluid is circulated therein.

According to the present invention, a method for treating heat exchanger tubing to be expanded by fluidic or electromagnetic expansion is provided. The tubing treatment reduces the increased material hardness of the tubing in areas where cold work has been imparted thereon. By reducing those areas which have increased material hardness, the tubing will have a substantially similar tube yield along its entire length and can therefore be expanded to substantially the same cross-sectional area throughout by either fluidic or electromagnetic expansion. In a preferred embodiment, the treatment consists of annealing the areas of increased material hardness with a heat source, such as flame or induction heating, and gradually cooling the areas to avoid the effects of quenching.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it should be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 1:
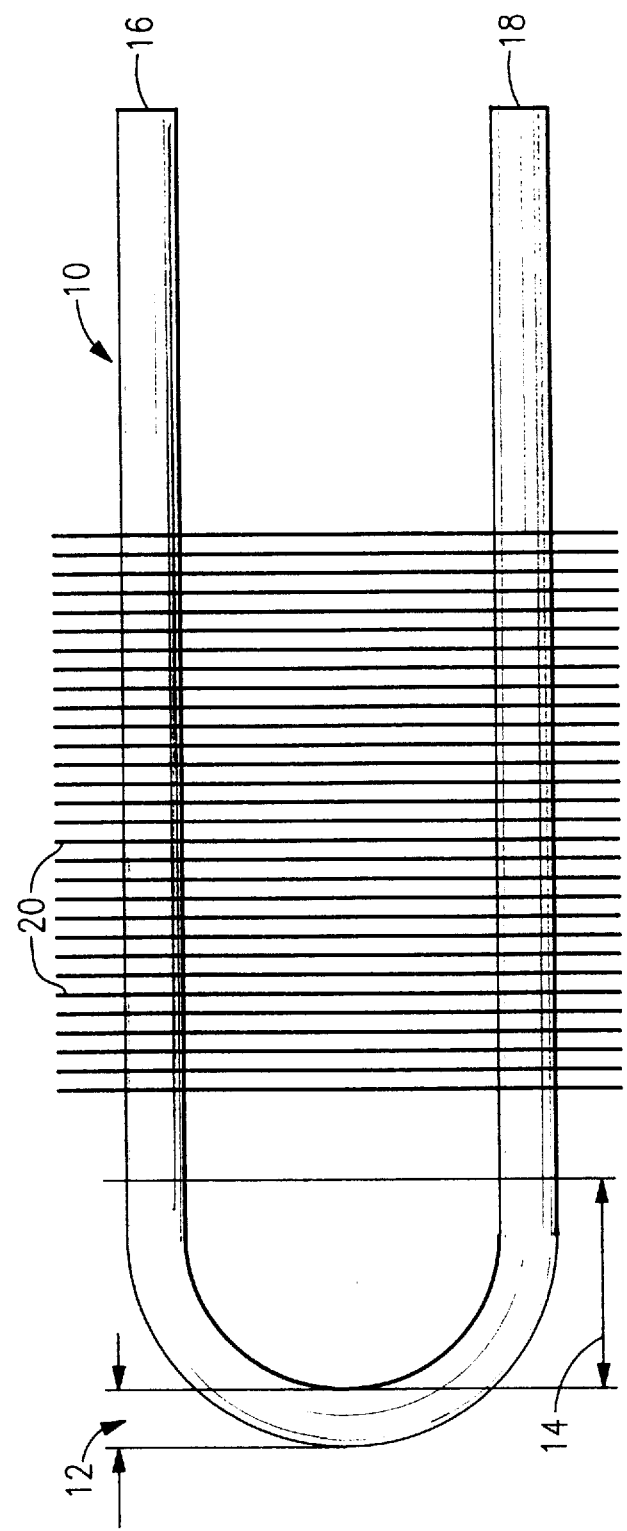
FIG. 1 is a side view illustrating the cold work area of a hairpin tube used in a heat exchanger.

Referring now to the drawings wherein like numerals designate corresponding parts throughout the various views, FIG. 1 is a side view illustrating a hairpin tube 10 for use in a heat exchanger having a hairpin bend 12, the formation of which results in a cold work area 14. Because of the cold work imparted on the area 14, the material hardness of the area 14 is higher than the remainder of the tube 10. The tube 10 has an inlet 16 for the intake of a heat exchanging fluid and an outlet 18 for the discharge of same. Also shown in FIG. 1 are plate fins 20 having bores corresponding to the inlet 16 and the outlet 18 for lacing the fins 20 upon the tube 10.

The cold work area 14 varies in length with respect to two different factors, the first of which is the sharpness of the bend. The greater the sharpness of the bend the longer the cold work area 14 will be. Additionally, the area 14 will decrease as the size of the tubing diameter decreases. Thus, larger tubing with sharp bends will have a much longer area of cold work than large tubing with gradual bends.

Figure 2:
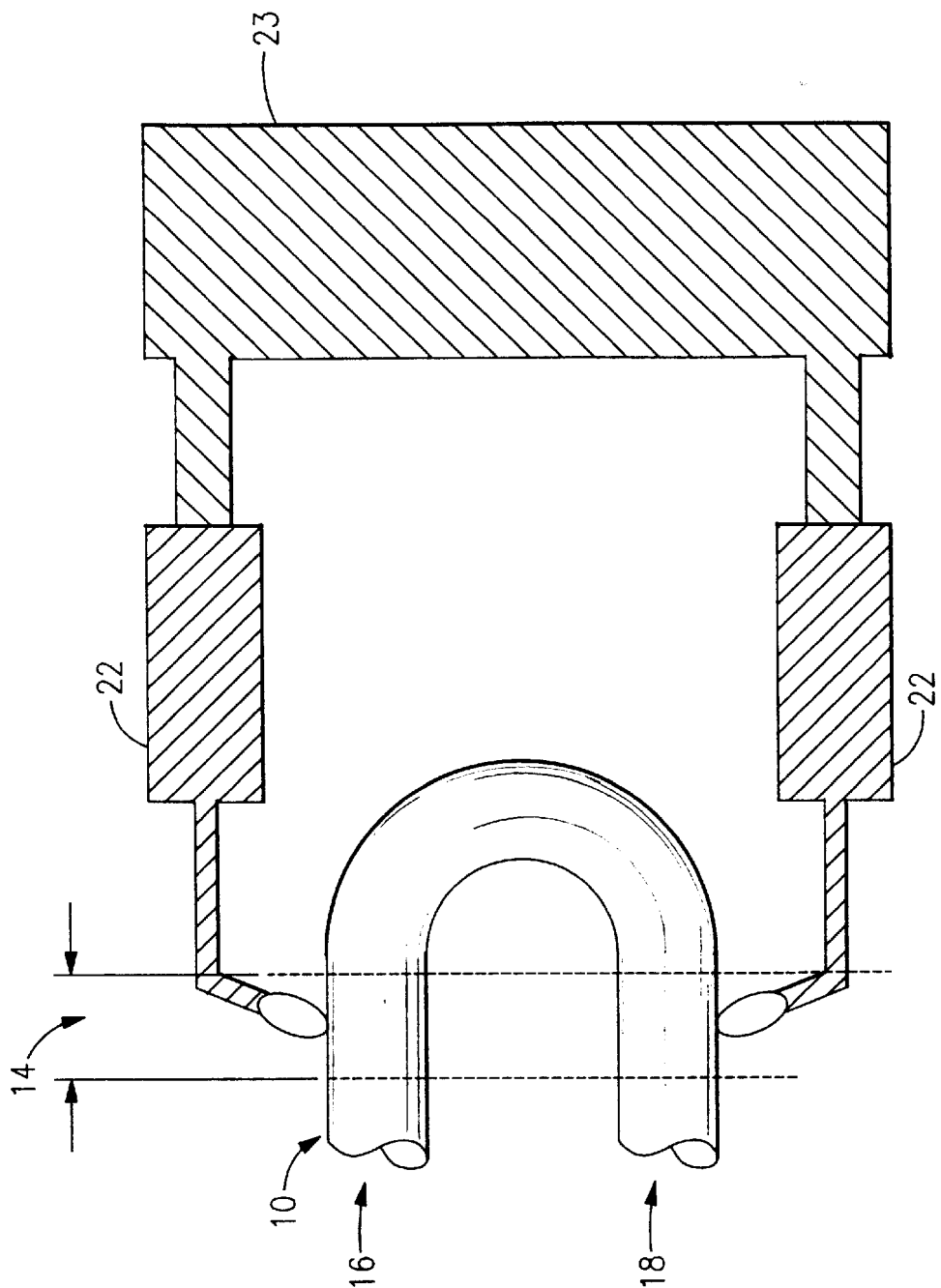
FIG. 2 is a diagrammatic view of an apparatus for performing the annealing process of the current invention.

FIG. 2 is a diagrammatic view of an apparatus for performing the annealing process of the current invention on a hairpin bend through the use of flame heating. Heat sources, such as the torches 22, are mounted to a fixture 23 to steady the torches and provide a constant source of fuel therefor. The heat will be applied for a brief duration, such as a few seconds or less, to the affected cold work area 14. The annealing process reduces the hardness of the material caused from the bending thereof, as well as from other sources of cold work. Reduced hardness correlates to a reduced tube yield, which allows the cold work area 14 to be expanded uniformly with the remainder of tube 10. An alternative method for performing the annealing would be induction heating, which is known in the art.

Figure 3:
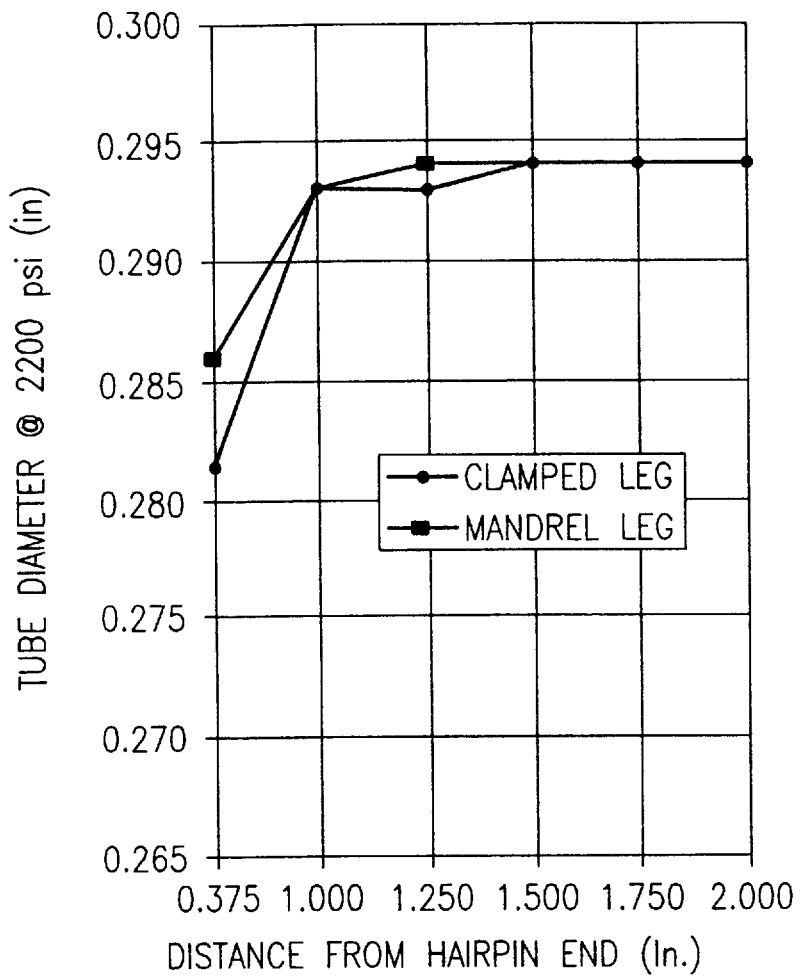
FIG. 3 is a graph of the final expansion of a hairpin tube that has not been treated for cold work.

FIG. 3 is a graph of the final expansion of a hairpin tube which has not been treated for cold work. FIG. 3 also illustrates the cold work effect that can occur from clamping a tube. Tubes are usually clamped to one side of a bend, cut, or similar operation to secure the tube for that operation. However, if a clamp is applied with too much pressure cold work will result along the clamped area. The clamped leg line of FIG. 3 represents the final diameter of a hairpin bend tube on the side of the bend that is clamped during the bending operation. The mandrel leg line represents the tube diameter on the opposite side of the bend from the clamp, wherein a mandrel was inserted to form the bend.

In the particular expansion shown, which was performed on a 7 mm tube, it can be seen that at 0.375 inches from the bend the diameter of the clamped leg is approximately 0.005 inches less than the mandrel leg. However, note that the diameter of the mandrel leg at this point is still nearly a full 0.01 inches shorter than the diameter of the tubing at 1.5 inches from the bend. At 1 inch from the bend, the diameter of both legs is approximately 0.001–0.002 inches less than the tube at 1.5 inches from the bend.

At 1.25 inches from the bend, the mandrel leg has reached the same diameter as the remainder of the tube, but the effects of the clamping prevent the clamped leg from reaching this diameter until 1.5 inches from the bend. Both legs of the tube achieve a substantially similar final diameter beyond 1.5 inches from the bend. If the tube in this example had been treated according to the current invention, both the mandrel leg and the clamped leg lines would have been essentially flat (at approximately a 0.295 inch final diameter) along their entireties.

Figure 4:
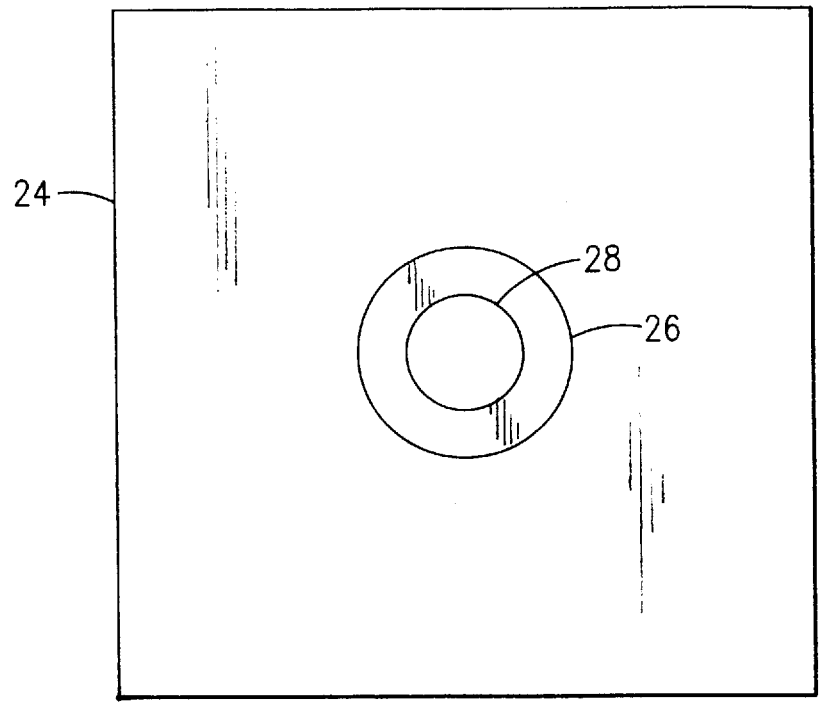
FIG. 4 is a cross-sectional view of a round, HVAC type circular heat exchanger tube extending through the bore in a plate fin.

FIG. 4 is a cross-sectional view of a round, HVAC-type circular heat exchanger tube extending through the bore in a plate fin. FIG. 4 illustrates how a sufficient contact is formed between the tubes and fins of a HVAC type heat exchanger. The plate fin 24 has a bore therethrough, and the tube 26, shown on its cross section, is threaded through the bore. The tube 26 forms a fluid path 28, and during the expansion process the path 28 is sealed so that an expansion fluid, such as nitrogen or air, can be introduced therein. In response to the high pressure expansion fluid, the walls of the tube 26 expand radially outward until the tube 26 meshes with the fin 24, thereby forming a secure and conductive relationship therewith. The same expansion could similarly be achieved through electromagnetic expansion.

Figure 5:
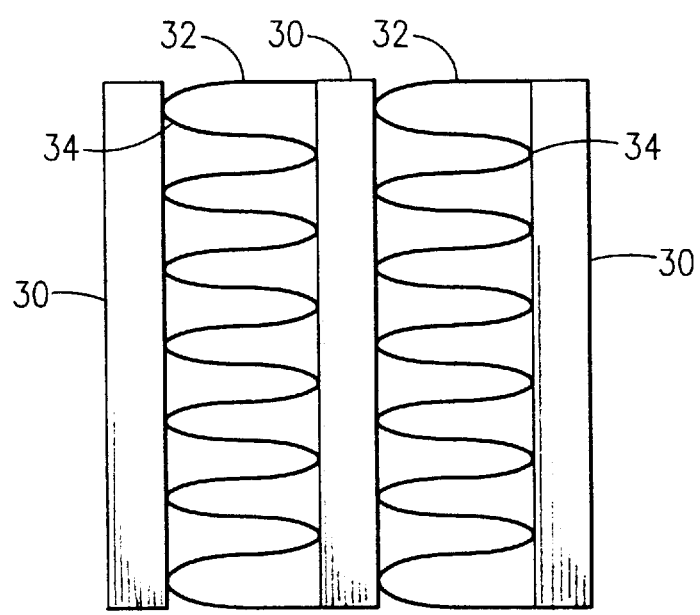
FIG. 5 is a side view of an automotive type heat exchanger having rectangular tubes and serpentine fins.

FIG. 5 is a side view of an automotive-type heat exchanger having rectangular tubes and serpentine fins. FIG. 5 is illustrative of a proper contact between the rectangular tubes 30 and the serpentine fins 32 in an automotive type heat exchanger. The fins 32 would normally be placed between the tubes 30 and then bonded together by brazing. After this brazing process, a high pressure expansion fluid would be introduced into the tubes 30 after the tubes 30 have been fluidically sealed. In response to the high pressure fluid, tubes 30 would radially expand outward such that the points 34 of the fins 32 would engage the surface of the tubes 30, forming a more secure and conductive relationship therewith.

Again, a similar expansion to that described above could be achieved through electromagnetic expansion. It should also be noted that expansion is typically not required in the construction of automotive style heat exchangers because brazing can usually form a sufficient conductive contact. However, the present invention would be desirable when brazing is not feasible, which may necessitate the use of fluidic or electromagnetic expansion, and the tubing has been affected by cold work operations such as clamping and the like.

Although the invention has been shown and described with respect to a best mode embodiment thereof, it should be understood by those skilled in the art that various changes, omissions, and additions may be made to the form and detail of the disclosed embodiment without departing from the spirit and scope of the invention as recited in the following claims.

What is claimed is:

1. A method of manufacturing a heat exchanger, with the heat exchanger being of the type having round tubing with plate fins attached thereto, the tubing having areas of increased material harness from the cold work imparted thereon to form hairpin bend sections, the method promoting removal of the increased area of material hardness to provide a uniform material hardness along the entirety of the linear sections of the tubing and correspondingly uniform expansion during fluidic or electromagnetic expansion, the method comprising:

a) forming said hairpin sections by bending each tubing section into a "U" shape, thereby creating an area of cold work, wherein said area of cold work includes the bend and the linear sections of the tubing near the bend;

b) heating said area of cold work in said linear sections to a predetermined temperature sufficient to relieve the increased hardness caused by said cold work;

c) gradually cooling said heated area; and d) expanding the tubing by enclosing the volume of the tubing and introducing an expansion fluid therein at a pressure which surpasses the tube yield strength causing the tube walls thereof to expand radially outward.

2. The method of claim 1, wherein said heating of step b) is performed by flame heating.

3. The method of claim 1, wherein said heating of step b) is performed by induction heating.

4. A method of manufacturing a heat exchanger, with the heat exchanger being of the type having rectangular tubing with serpentine fins attached thereto, the tubing having areas of increased material harness from the cold working the tubing, the method promoting removal of the increased areas of material hardness to provide a uniform material hardness along the entire linear section of the tubing and correspondingly uniform expansion during fluidic or electromagnetic expansion, the method comprising:

a) cold working said tubing sections, thereby creating areas of increased material hardness thereon;

b) heating said sections to a predetermined temperature sufficient to relieve the increased hardness caused by said cold work;

c) gradually cooling said tubing; and d) expanding the tubing by enclosing the volume of the tubing and introducing an expansion fluid therein at a pressure which surpasses the tube yield strength causing the tube walls thereof to expand radially outward.

5. The method of claim 4, wherein said heating of step b) is performed by flame heating.

6. The method of claim 4, wherein said heating of step b) is performed by induction heating.

\* \* \* \* \*